United States Patent [19]
Cunningham

[11] Patent Number: 5,437,310
[45] Date of Patent: Aug. 1, 1995

[54] PLUG ASSEMBLY

[75] Inventor: Eugene E. Cunningham, Dublin, Pa.

[73] Assignee: Expando Seal Tools, Inc., Montgomeryville, Pa.

[21] Appl. No.: 286,527

[22] Filed: Aug. 5, 1994

[51] Int. Cl.6 ............................................. F16L 55/10
[52] U.S. Cl. .................................... 138/89; 138/97; 29/522.1
[58] Field of Search ............................ 138/89, 98, 90; 29/522.1, 510, 402.09

[56] References Cited

U.S. PATENT DOCUMENTS

| | | |
|---|---|---|
| 2,315,538 | 4/1943 | Moeller . |
| 2,773,619 | 12/1956 | Moeller . |
| 2,856,963 | 10/1958 | Hoerter . |
| 3,525,365 | 8/1970 | Meulendyk . |
| 3,983,904 | 10/1976 | Laviano .................. 138/90 |
| 4,091,841 | 5/1978 | Bencker et al. .......... 138/89 |
| 4,265,725 | 5/1981 | Tatum ..................... 29/522.1 |
| 4,303,101 | 12/1981 | Tholen . |
| 4,393,564 | 7/1983 | Martin . |
| 4,419,805 | 12/1983 | Calandra, Jr. .......... 29/522.1 |
| 4,425,943 | 1/1984 | Martin . |
| 4,436,117 | 3/1984 | Martin . |
| 4,611,485 | 9/1986 | Leslie . |
| 4,751,944 | 6/1988 | Sinha et al. . |
| 4,768,560 | 9/1988 | Logsdon .................. 138/90 |
| 4,771,810 | 9/1988 | Ermold et al. .......... 138/89 |
| 4,787,420 | 11/1988 | Wilhelm .................. 138/89 |
| 4,865,080 | 9/1989 | Lundguist ............... 138/89 |
| 4,903,657 | 6/1990 | Walker . |
| 4,982,763 | 1/1991 | Klahn ....................... 138/89 |
| 5,078,294 | 1/1992 | Staubli . |
| 5,249,604 | 10/1993 | Keating ................... 138/89 |

Primary Examiner—David A. Scherbel
Assistant Examiner—James F. Hook
Attorney, Agent, or Firm—Howson and Howson

[57] ABSTRACT

A wedge and ring-type plug assembly for plugging a heat exchanger tube to provide a leak resistant seal. The plug assembly is designed to reduce the effect of friction forces so that the tapered elongate wedge can be displaced through the compressible ring with a relatively low amount of force.

16 Claims, 7 Drawing Sheets

PLUG ASSEMBLY

FIELD OF THE INVENTION

The present invention relates to expandable plugging devices, and more particularly, the present invention relates to an expandable plug assembly which is particularly suited for use in plugging tubes such as may be found in heat exchangers.

BACKGROUND OF THE INVENTION

Shell and tube-type heat exchangers customarily comprise a bundle of tubes mounted in spaced parallel relation at opposite ends in tube sheets. The tube bundle is surrounded by a shell through which a medium is flowed between an inlet and an outlet of the shell. Heads are provided on opposite ends of the shell to afford the flow of another medium through the interior of the tube bundles. In multiple pass heat exchangers, one head end of the heat exchanger may be provided with flow reversing means to cause the fluid to flow within selected tubes and make several passes before exiting the heat exchanger.

Heat exchangers of the above type have been known to fail in use and to require repair. Generally, this is accomplished by removing the head at opposite ends of the tube, and either removing, or replacing, the defective tube, or plugging the defective tube. Since such heat exchangers are often integral components of continuous plant processes, it is important that they be repaired quickly within a minimum of downtime.

Various types of plugs are known for sealing off defective tubes. For instance, U.S. Pat. Nos. 2,856,963; 4,393,564; 4,425,943; and 4,436,117 all relate to expandable plugging devices for use in shell and tube-type heat exchangers as described above. A typical plug assembly comprises a radially deformable sleeve adapted to be placed in a tube of a heat exchanger in alignment with its tube sheet and an elongated wedge slidably received within the sleeve for expanding the sleeve outwardly when pulled axially relative to the sleeve. A breakaway member is mounted at the narrow end of the wedge and is connected to a pull rod which cooperates with a compression tube engaging the sleeve to pull the wedge into the sleeve and expand it outwardly to provide a fluid type joint. After a predetermined amount of outward pressure has been applied, the breakaway ruptures to permit removal of the pull rod and compression tube from within the plugged tube.

While the aforementioned plug assemblies and associated placement apparatus function entirely satisfactory for their intended purposes, it has been found that the creation of an effective seal in a specific sized heat exchanger tube is difficult to accomplish because the stated size is often different then the actual size of the inner diameter. The inner diameters of heat exchanger tubes may vary due to variations in manufacturing tolerances and the formation of scale and corrosion. A plug assembly must be able to accommodate these conditions and still effect a strong seal. Hence, a plug assembly which can successfully apply an effective seal on a wide range of tube inner diameter tolerances and conditions is particularly desirable.

OBJECTS OF THE INVENTION

With the foregoing in mind, a primary object of the present invention is to provide an improved expandable plugging assembly for use in the ends of tubes in heat exchangers.

Another object of the present invention is to provide a novel means for obtaining greater compression of the plugging ring's external sealing surfaces against the inner walls of tubes to obtain a more effective seal.

A further object of the present invention is to provide a single sized plug assembly which can apply effective sealing pressure over a wide range of tube diameter tolerances and surface conditions.

A still further object of the present invention is to provide means for obtaining more consistent sealing results from one plug assembly to another in tubes of the same nominal inside diameters.

Yet another object of the present invention is to provide a plug assembly which minimizes the amount of lubricant required, and in some applications, eliminates altogether the need for a lubricant.

SUMMARY OF THE INVENTION

More specifically, the present invention provides a plug assembly which affords desirable sealing capabilities over a wide range of tolerances and conditions associated with the inner surfaces of tubes. The plug assembly comprises a compressible ring which has a longitudinal axis and a side wall. The side wall has an interior and an exterior surface. The interior surface has a series of axially spaced annular lands and grooves. A tapered elongate wedge having a narrow end and a wide end is receivable within the compressible ring for slidable movement along its longitudinal axis. A breakaway means is attached to the narrow end of the wedge for transmitting an axial tensile force to the wedge. The breakaway means is designed to rupture upon application of a predetermined force.

When the compressible ring is located within the tube, and a tensile force is applied to the wedge and a reactive axial compressive force is applied to the ring, the narrow end of the wedge is pulled relative to the ring. The wedge expands the side wall of the compressible ring radially outwardly to seal against the inner surface of the tube. The lands and grooves formed in the interior surface of the compressible ring reduce the friction between the wedge and the compressible ring, thereby allowing the wedge to be advanced further through the ring with less of a pulling force. The above assembly enables an effective seal to be produced in tubes having a wide range of inner diameter tolerances, particularly when the ring also has sealing edges on its outer surface.

An alternate embodiment is disclosed which places the grooves and lands on the wedge and provides for a smooth ring inner surface.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENTS

Figure 1:
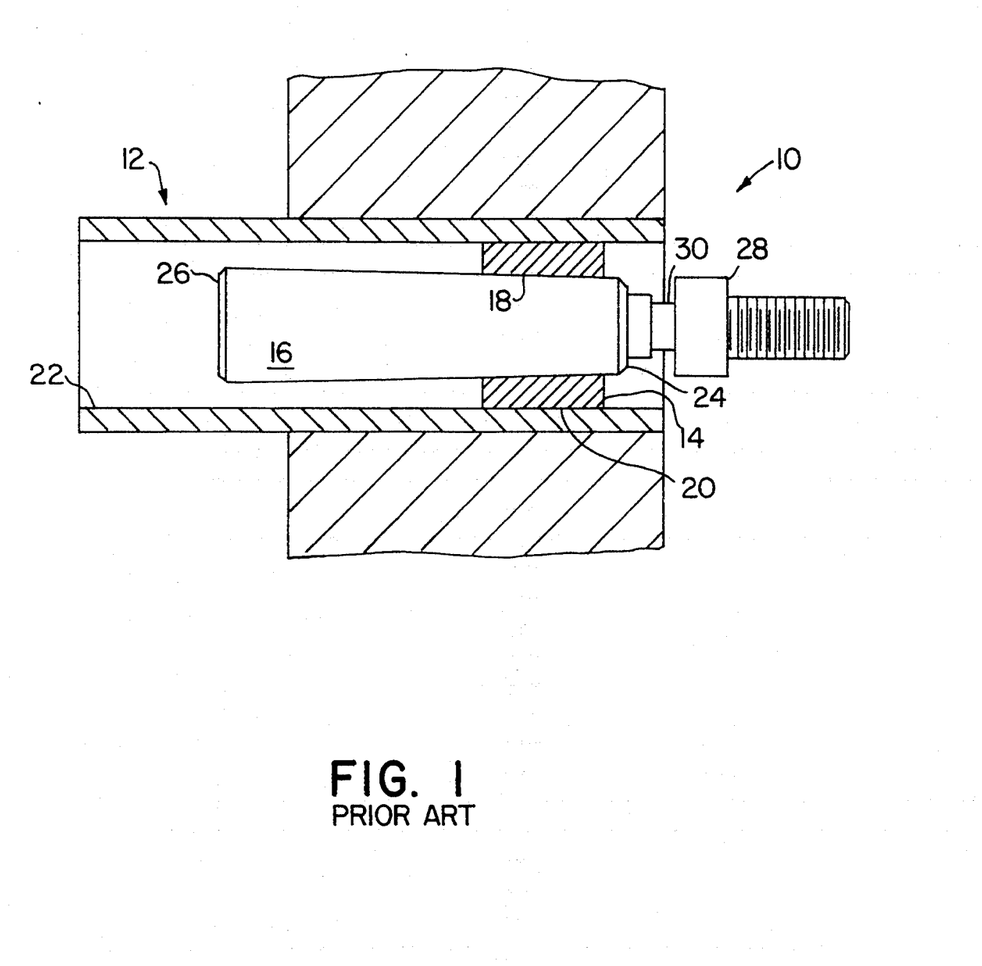
FIG. 1 is a cross sectional view of a prior art plug assembly.

Referring now the drawings, FIG. 1 illustrates a prior art plug assembly 10 for use in plugging a heat exchanger tube 12. The plug assembly 10 has a compression ring 14 and a tapered elongate wedge 16 received within the compression ring 14. The ring 14 is cylindrical and shaped to fit within the cylindrical heat exchanger tube 12 which is to be sealed. The ring 14 has a smooth inner and outer surface, 18 and 20, the outer surface 20 for contacting the inner surface 22 of the heat exchanger tube 12 and the inner surface 18 for contacting the tapered elongate wedge 16.

The tapered elongate wedge 16 has a frustoconical shape with a narrow end 24 and an enlarged end 26. There is a constant taper between the narrow end 24 and enlarged end 26. The compression ring 14 has an internal taper that mates with the taper of the elongate wedge 16.

The plug assembly has a breakaway means 28 that is connected to the narrow end 24 of the tapered elongate wedge 16. The opposite end of the breakaway means 28 is connected to a pulling mechanism (not shown) of the type described in U.S. Pat. No. 4,425,943, the disclosure of which is incorporated by reference herein. The pulling mechanism is supported against one end of the ring 14 and acts hydraulically, or mechanically, to pull the tapered wedge 16 through the compression ring 14 and expand the compression ring radially outward until it effectively seals against the inner surface 22 of the tube 12. The breakaway means 28 is designed to function in a manner which provides an automatic release after a predetermined sealing pressure has been applied by the wedge 16 to the compression ring 14. The breakaway means 28 accomplishes this release at the point where the force pulling the tapered wedge 16 through the compression ring 14 increases the tensile stress in the relieved portion 30 of the breakaway means 28 to cause its fracture.

To fully understand the present invention and its advance over the plug assembly of the prior art, the various forces acting on, and associated with, the plug assembly should be understood.

The first force is a pulling force applied to the wedge. The pulling force is applied along the heat exchanger tube's longitudinal axis out of the end of the tube. An equal, but oppositely applied reaction force is applied against the compression ring so that it remains stationary relative to the heat exchanger tube and so that the wedge is displaced within the compression ring. Another force which is active within the plug assembly is that of friction between the inner surface of the compression ring and the wedge. A given pulling force on the wedge will advance the wedge a given distance through the compression ring until friction overcomes the pulling force and arrests further movement of the wedge. It will then require a greater pulling force in order to advance the wedge further through the compression ring.

Figure 2:
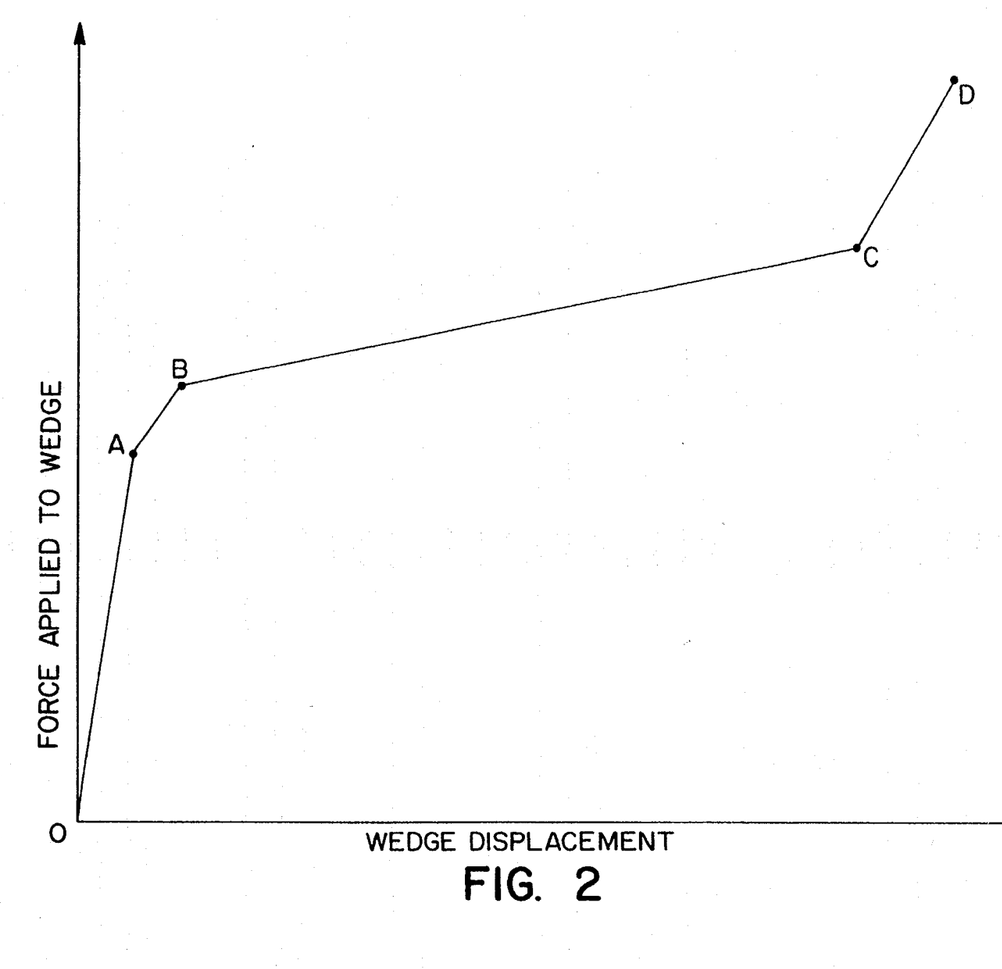
FIG. 2 is a graph schematically illustrating the function of a plug assembly in relation to the required force necessary to displace the wedge.

Turning to FIG. 2, the graph illustrates schematically the force needed to displace the wedge within the compression ring, and the various states of the compression ring until an adequate seal is formed and the breakaway portion ruptures. The first portion of the curve is from the origin "O" to point "A". In the "OA" region, force is applied to the wedge in order to displace the wedge within the compressible ring and overcome the forces of friction between the wedge and the ring. It should be noted that during relative movement of the wedge and ring in the "OA" portion of the curve, the ring expands. Note, that expansion is elastic, and therefore different from plastic deformation, in that if the force were removed and the wedge was reversely displaced, the compression ring would return to its original shape.

At point "A" the ring begins to deform plastically at its inner surface. As shown in FIG. 2, as more force is applied beyond point "A" the wedge is displaced a greater distance for equal increments of additional force when compared with that of section "OA" due to plastic deformation of the ring. It should be noted, that in this section, if the force and the wedge were removed, the compression ring would not return to its original shape due to the plastic deformation.

At point "B" plastic deformation begins along the outer surface of the ring. Now that the entire ring is being plastically deformed, the wedge is displaced a greater distance for equal increments of increased force as compared with sections "AB" and "OA" of the curve. As the force increases beyond "B" the entire compression ring is plastically deforming in substantially a radially outward direction. However, it is not until point "C" that the outer surface of the compression ring fully contacts the inner surface of the heat exchanger tube and is prevented from further radial expansion.

At point "C", the outer surface of the compression ring comes into complete contact with the inner surface of the heat exchanger tube. At this point in the curve, the seal is now being formed. It should be noted that since the inner surface of the tube is now restricting the radially outward plastic deformation of the outer surface of the compression ring, the wedge is being displaced a shorter distance for equal increments of increased force in the portion of the curve "CD" as contrasted with that of "BC".

The breakaway means is designed to rupture at a predetermined level of force. Therefore, at point "D", which equals the predetermined rupture level, the breakaway portion fails and the plug is set within the heat exchanger tube. It should be noted that the breakaway force level is limited by the structural limitations of the heat exchanger tube. Also, the wedge should not deform under forces applied up to and including the breakaway level.

The graph of FIG. 2 teaches that the change in force and wedge displacement in the "CD" region of the curve needs to be relatively large to obtain a good seal between the heat exchanger tube and the compression ring. The compression of the ring against the heat exchanger tube increases with increased displacement of the wedge in the ring. Therefore, increased compression and optimal sealing formation is facilitated by the increased force change between points "C" and "D". It has been confirmed experimentally that increased compression of the ring against the tube has two benefits.

One benefit is that the plug can withstand a greater pressure differential before it is dislodged from the tube. The other benefit is that greater compression makes it possible to seal larger irregularities in the tube.

It should be apparent that if the breakaway force "D" is reached before the compression ring fully contacts the inner surface of the tube, i.e. point "C", then a leak would surely occur. In addition, it should also be apparent that the closer the points "C" and "D" are on the curve, the less effective the seal. This condition is shown in FIG. 3 which also shows the decreased effectiveness of the seal when used on tubes having different inside diameter tolerances.

Figure 3:
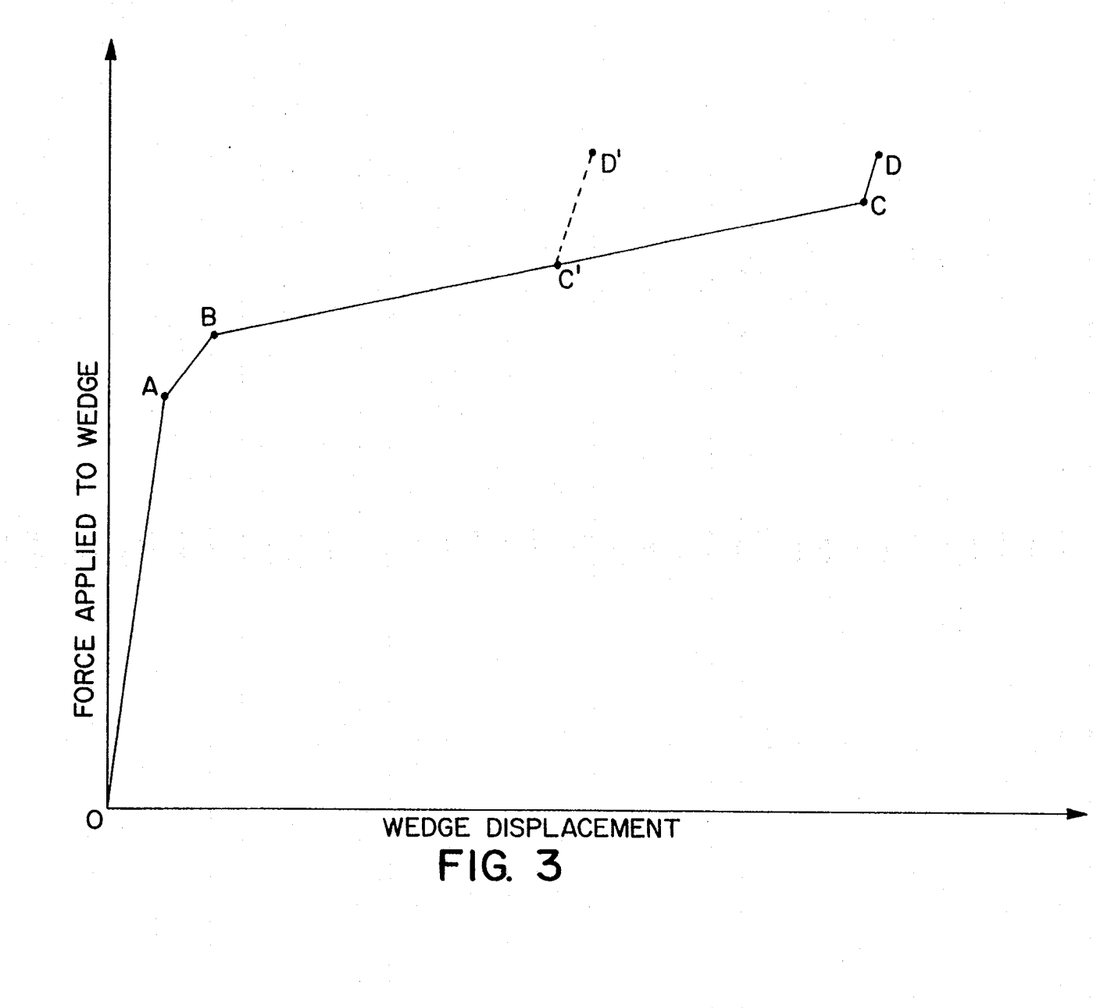
FIG. 3 is a graph schematically illustrating a plug assembly requiring a high pulling force in relation to two different tube inner diameters.

FIG. 3 illustrates schematically pulling forces versus wedge displacement for a plug assembly which requires relatively great amounts of force to plastically deform the ring, points "A" and "B", and to cause the ring to fully contact the tube inside surface, point "C" and "C'". "C" and "C'" represent different tubes which have different inner diameters, "C'" being slightly smaller than "C". It should be apparent that as the ring deforms radially outward, it will fully contact the inner surface of the tube denoted as "C'" before that of "C". After reaching the conditions of "C" and "C'", additional force is applied until the breakaway force level, denoted at "D" and "D'", is reached.

The change in force between "CD" in FIG. 3 is smaller than that between "C'D'". Therefore, as stated earlier, the effectiveness of the seal in the larger inside diameter tube is much less than that of the smaller inside diameter tube. Even the change in force denoted "C'D'" in the smaller inside diameter tube will result in a less than satisfactory seal formation.

The thrust of the present invention is to provide a plug assembly in which there is substantial change of force between the points "C" and "D" as noted on the aforementioned curves before breakaway occurs. Since the breakaway level denoted as "D" has structural limitations based on the limitations of the heat exchanger tube sheet and the strength of the wedge, the only way to accomplish the above goal is to allow the points "A", "B", and "C", as depicted on the above-referenced curves, to be reached with lower amounts of force.

Figure 4:
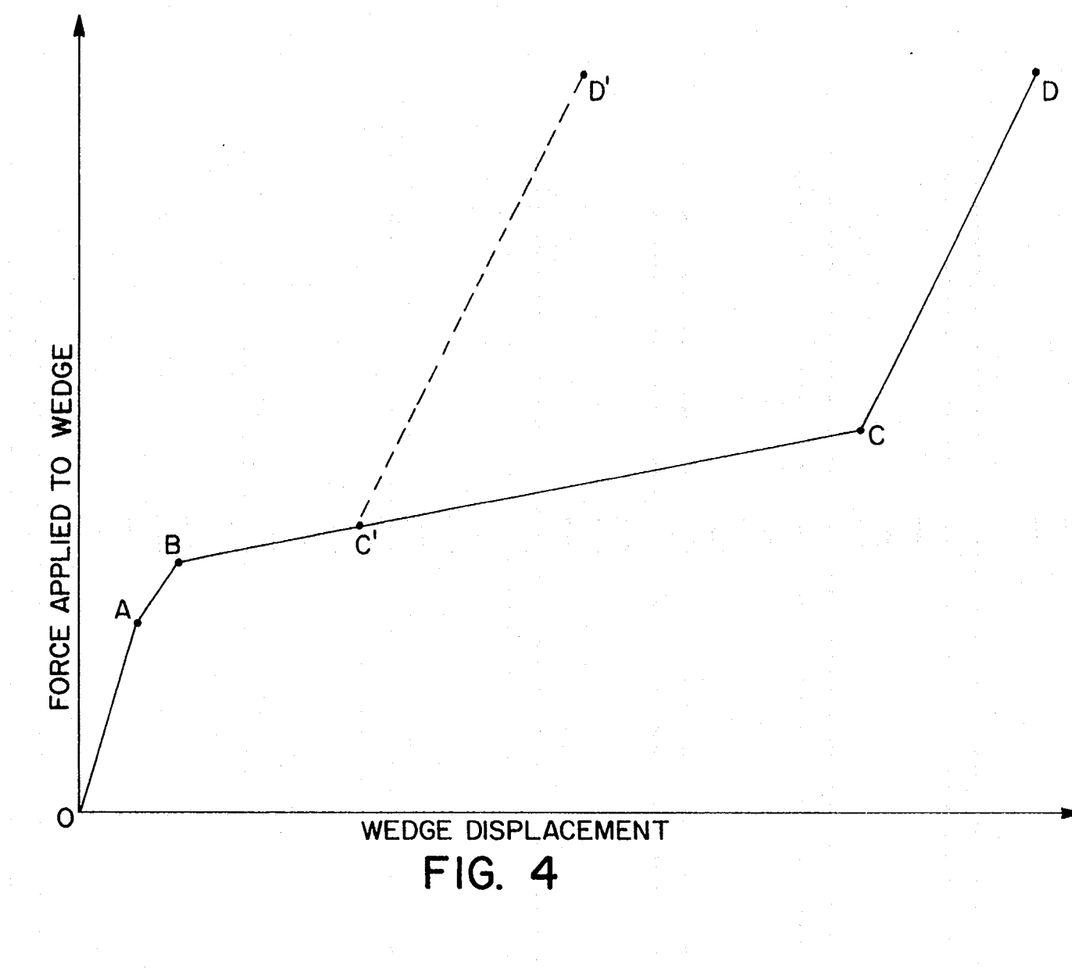
FIG. 4 is a graph schematically illustrating a plug assembly requiring a low pulling force relative to the same two different tube inner diameters.

FIG. 4 illustrates the pulling force and wedge displacement of a plug assembly which requires relatively low amounts of force to plastically deform the ring, points "A" and "B", and to cause the ring to fully contact the tube inner diameter, point "C and C'". "C and C'" represent different tubes which have different inner diameters, "C'" being smaller than "C".

Although the change in force between "CD" in Fig. 4 is smaller than that between "C'D'", both plugging assemblies result in the creation of an effective seal. This results because the respective changes in force between "CD" and "C'D'" are both relatively large. The portions "CD" and "C'D'" result in effective seals since the force required to reach the point "C" and "C'" on the curve is relatively low, when compared with that in FIG. 3. It should be noted that due to the low force necessary to reach points "C'" and "C", the same sized plug assembly can result in an effective seal in a large range of tolerances of the tube inside diameters. For the plug assembly to perform in the manner shown in FIG. 4, the friction force between the wedge and the ring must be reduced.

Several methods of reducing friction between the ring and the wedge have been attempted; however, all of these methods have significant drawbacks. Lubricant can be added between the ring and the wedge, and has been used successfully to reduce friction. However, after the seal has been made, the lubricant still remains between the wedge and the ring, and this reduces the grip between the wedge and the ring. This may enable the seal to fail under pressure conditions that are lower than desirable. A ring and wedge have been designed with smoother surfaces to reduce friction; however, this technique still results in a reduced grip between the wedge and the ring resulting in less effectiveness of the seal. The ring has been designed with shorter lengths to decrease friction between the wedge and the ring; however, this also has the effect of reducing the grip between the wedge and the ring when the assembly is set in place.

According to the present invention, it has been discovered that friction between the wedge and the ring can be reduced by providing a series of shallow circumferential lands and grooves at axially-spaced locations on the inner surface of the ring. The larger the grooves, and the smaller the lands, i.e. the contact surface, between the ring and the wedge, the lower the friction. This results in a plug assembly capable of reaching the point "C" defined in the graph of FIGS. 2, 3, and 4 at a relatively low value of pulling force.

Figure 5:
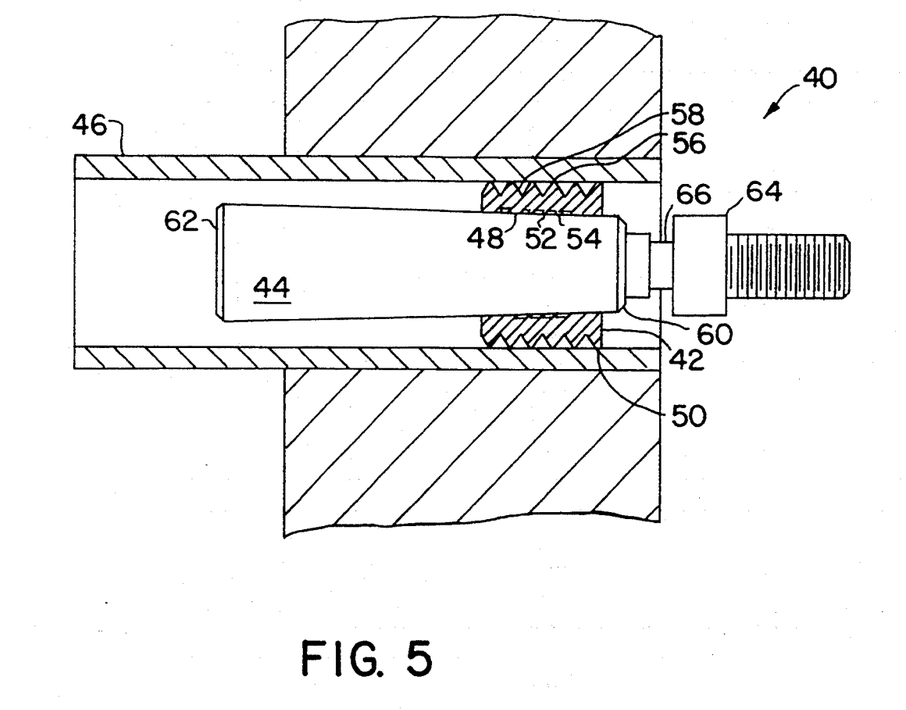
FIG. 5 is cross sectional view of a plug assembly according to the present invention.

FIG. 5 shows one preferred embodiment of a plug assembly according to the present invention. The plug assembly 40 comprises a ring 42 and a tapered elongate wedge 44 slidably receivable within the ring 42. The ring 42 is cylindrical and shaped to fit within the heat exchanger tube 46 which is to be sealed.

The compression ring 42 has an inner surface 48 which contacts the tapered wedge 44 and an outer surface 50 which contacts the inside surface of the heat exchanger tube 46. The inner surface 48 of the ring 42 has a series of grooves 52 and lands, or contact points, 54. The lands 54 and grooves 52 extend circumferentially in axially spaced relation. The lands 54 are the portion of the inner surface 48 of the ring 42 which contacts the wedge 44. The grooves 52 function to lower the friction force between the ring 42 and the wedge 44 and to allow the wedge to be displaced further through the ring 42 with less pulling force.

The outer surface 50 of the compression ring 42 has a series of external circumferential sealing edges 56 alternating with grooves 58. The sealing edges 56 contact the inside of the heat exchanger tube 46 and provide the seal between the plug assembly 40 and the tube 46. The edges 56 are designed to deform plastically when the edges are forced into engagement with the inside of the tube 46. The shape of the edges 56 also helps to cut through any scale and corrosion located in the heat exchanger tube 46 that maybe left-over after brushing, resulting in a more effective seal. For a more complete description of a ring having sealing edges 56 of this configuration, references is made to U.S. Pat. No. 4,436,117, the disclosure of which is incorporated by reference herein.

As best seen in FIG. 5, the wedge 44 has a frustoconical shape with a narrow end 60 and an enlarged end 62. The elongate wedge 44 has a taper between narrow end 60 and enlarged end 62 which mates with the taper defined by contact points 54 of the ring 42. It is important that the ring 42 be deformable relative to the wedge 44 so that the ring expands radially outward when the wedge is displaced axially within the ring 42. It is equally important that the wedge 44 be capable of resisting plastic deformation under the pressures necessary to displace the wedge 44 through the compressible ring 42. Thus, the ring 42 and the wedge 44 may be fabricated of brass, stainless steel, or cold rolled steel, or any other metals depending on the operating environment in which the plug assembly 40 is to be installed, such as pressures, temperatures, service life, etc.

Figure 6:
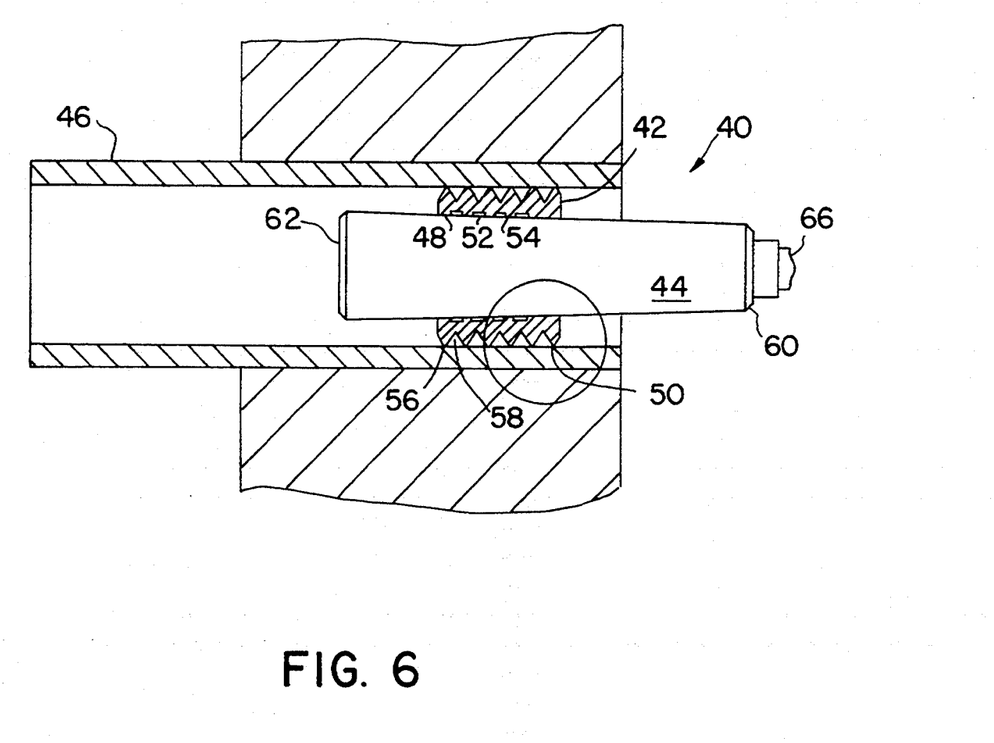
FIG. 6 is a cross sectional view of the plug assembly of FIG. 5 after the wedge has been displaced through the ring and the breakaway means has ruptured.

Plug assembly 40 also has a breakaway means 64 that functions to provide an automatic release after a predetermined sealing pressure has been applied by the wedge 44 to the ring 42. The breakaway means 64 accomplishes this release at the point where the force pulling the tapered elongate wedge 44 through the compressible ring 42 increases the stress in the release portion 66 of the breakaway means 64 to fracture it. As shown in FIG. 5, the breakaway means 64 is threaded into the narrow end 60 of the wedge 44. The breakaway means 64 is also threaded into a pulling mechanism (not shown) of the type described in U.S. Pat. No. 4,425,943. FIG. 6 illustrates a set plug assembly after the breakaway means 64 has ruptured and been removed.

Figure 7:
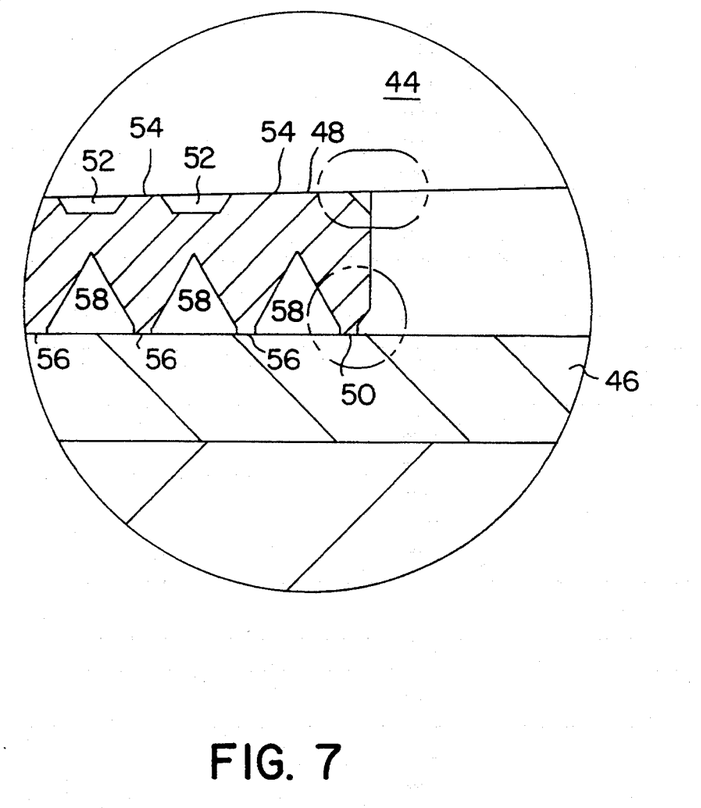
FIG. 7 is a cross section detailed view of a portion of FIG.

It has been found through experimentation that the relationships between the placement of the grooves 52, lands or contact points 54, edges 56, and grooves 58 of the ring 42 can affect the quality of the seal created. Preferably, as shown in the enlarged view of FIG. 7, the inside ring grooves 52 and outside ring grooves 58 are positioned such that the lands, or contact points 54, and the sealing edges 56 are in alignment transverse to the axis of motion of the wedge. This alignment allows the force applied by the wedge to the lands 54 to transmit force in an efficient manner to the sealing edges 56. Therefore, as shown on FIG. 7, in a somewhat exaggerated manner for purposes of illustration, the sealing edges 56 engage the inner surface of the heat exchanger tube and plastically expand thereagainst. Since, the grooves 52 of the ring 42 decrease the friction between the ring 42 and the wedge 44, there is a relatively large change in force and displacement of wedge 44 before reaching the breakaway rupture pulling force value. This results in an effective seal which is capable of being applied to tubes having a range of inner diameter tolerances and conditions.

With the design of the present invention, it is possible to further reduce the force of friction by adding lubricant to the inner surface of the ring. The drawbacks associated with using lubricant on prior art plug assemblies are not present with the design of the present invention, since after the wedge is displaced through the ring, the lubricant is squeezed into the grooves. Therefore it has less of an affect on the grip between the contacting surfaces of the ring and the wedge.

By way of example, and not by way of limitation, plug assemblies fabricated in accordance with the present invention have been tested and found capable of providing an effective seal in tubes having a range of tolerances. In one set of tests, a tapered wedge having a diameter of 0.333 inches at its narrow end and 0.430 inches at its larger end was assembled in combination with a compression ring having an outer diameter of 0.499 inches at the sealing edges, and an overall ring length of 0.351 inches. The ring has five sealing edges separated by four grooves, with each sealing edge being 0.010 inches in maximum length. The sum total of the lengths of all wedge contacting points was 0.172 inches. The inner diameter of the inner surface groove was 0.364 inches. Plug assemblies incorporating this specific ring design were installed into tubes having a range of inner diameters from 0.504 inches to 0.528 inches. When installed and tested, this plug assembly was found to be capable of resisting fluid pressure in excess of 19,819 psi in a tube inner diameter of 0.504 inches; 18,306 psi in a tube inner diameter of 0.507 inches; 18,099 psi in a tube inner diameter of 0.525 inches; and 16,850 psi in a tube inner diameter of 0.528 inches, without leaking.

In view of the foregoing, it should be apparent that the present invention now provides improved plug assemblies which can be used to provide effective seals in a range of inner diameters of heat exchanger tubes.

While a preferred embodiment of the present invention has been described in detail, various modifications, alterations, and changes may be made without departing from the spirit and scope of the present invention as defined in the appended claims.

I claim:

1. A plug assembly for use in plugging a tube having an inner surface, comprising:
   a ring having an inner surface and an outer surface, said outer surface for contacting the inner surface of the tube; and
   an elongate wedge receivable within said ring for radially outwardly expanding said ring to seal against the inner surface of the tube when said wedge is displaced axially at least partially through said ring, said wedge having an outer surface, said ring inner surface and said wedge outer surface being disposed in confronting relation and being slidable relative to one another,
   said ring inner surface having at least one groove formed therein and said wedge outer surface being smooth, said at least one groove in said ring inner surface cooperating with said wedge outer surface for reducing friction between said ring inner surface and said wedge when said wedge is being displaced through said ring.

2. A plug assembly according to claim 1, wherein said inner surface of said ring has a series of said inner surface grooves alternating with inner surface lands for slidably contacting said elongate wedge.

3. A plug assembly according to claim 2, wherein said outer surface of said ring has a plurality of outer sealing edges and grooves for deformably engaging the inner surface of the tube.

4. A plug assembly according to claim 3, wherein said ring outer sealing edges are aligned with said inner surface lands so that said outer sealing edges are plastically deformed against the inner surface of the tube as said elongate wedge advances through said ring.

5. A plug assembly according to claim 4, wherein said ring inner surface grooves extends circumferentially about said inner surface of said ring in axially-spaced relation with said inner surface lands being located therebetween.

6. A plug assembly according to claim 5, wherein said ring inner surface grooves have a lesser axial extent than said ring outer surface grooves.

7. A plug assembly according to claim 6, wherein each of said ring inner surface grooves has a depth which is less than its axial extent.

8. A plug assembly for use in plugging a tube having an inner surface, comprising:
   a ring having a longitudinal axis and a sidewall, said sidewall having an outer surface for engaging said tube inner surface and an inner surface;
   a tapered elongate wedge having a narrow end and a wide end with an outer surface extending between said ends, said narrow end receivable within said ring and said wedge outer surface being slidable along said longitudinal axis, said ring inner surface and said wedge outer surface confronting one another when assembled, one of said confronting surfaces being located on said wedge and being smooth and the other being located on said ring inner surface and having at least one peripheral groove formed therein; and a breakaway means attachable to said wedge for transmitting a force to displace said wedge partially through said ring, said breakaway means being capable of automatically disconnecting from said wedge upon application of a predetermined maximum force;

wherein, when said ring is located within the tube and said force is applied to said wedge for advancing said wedge through said ring, said wedge contacts said ring inner surface and expands said sidewall radially outwardly to seal said ring outer surface along the inner surface of the tube;

wherein said ring outer surface has a plurality of sealing edges and at least one groove therebetween, wherein said sealing edges expand along the inner surface of the tube and create a seal between the inner surface of the tube and said outer surface of said ring;

wherein said inner surface of said ring has a plurality of lands adjacent to said at least one groove, and wherein said plurality of lands are in alignment with said plurality of sealing edges for urging said sealing edges into sealing engagement with the inner surface of the tube as said wedge advances through said ring;

whereby said lands and said at least one groove in said ring inner surface allows said wedge to be displaced further through said ring with less force to effect the desired sealing action.

9. A plug assembly according to claim 8, wherein a plurality of said grooves extend circumferentially in spaced axial relation along said ring inner and outer surfaces.

10. A plug assembly according to claim 2, wherein said ring inner surface is tapered along said longitudinal axis such that it mates with said tapered elongate wedge.

11. A plug assembly according to claim 10, wherein said ring is made from metal, wherein said metal is selected from the group consisting of brass, stainless steel and cold-rolled steel.

12. A plug assembly according to claim 11, wherein said tapered elongate wedge is capable of withstanding said forces so that said wedge does not deform.

13. A plug assembly according to claim 12, wherein said breakaway means in connected to said narrow end of said wedge, wherein said breakaway means transmits a pulling force to said narrow end of said wedge, and wherein said breakaway means ruptures away from said narrow end when said predetermined maximum force is applied.

14. A plug assembly according to claim 13, wherein said ring inner surface grooves have a lesser axial extent than the ring outer surface grooves.

15. A plug assembly for plugging an inner surface of a tube, comprising:

a tubular ring having an outer surface with a plurality of circumferential sealing edges and grooves disposed in spaced relation for engaging said tube inner surface to form a labyrinth seal therewith, said ring having an inner surface;

a wedge having a tapered surface confronting said ring inner surface and slidable relative thereto;

said tapered wedge confronting surface being smooth and said ring inner surface having formed thereon a plurality of axially spaced circumferential lands and grooves;

wherein said sealing edges and said lands are aligned to urge the sealing edges into sealing engagement with the inner surface of the tube as said wedge advances through the ring; and wherein said ring inner surface grooves have less of an axial extent than said ring outer surface grooves;

wherein when said wedge is forced through said tubular ring, said compressible tubular ring expands radially outward to seal against the inner surface of the tube; and wherein said ring inner surfaces grooves cooperate to reduce friction created between said wedge and said ring as said wedge is displaced through said ring.

16. A plug assembly according to claim 15, further comprising a breakaway means having a breakaway force value for displacing said wedge through said ring and automatically disconnecting from said wedge when said breakaway force value is applied to the plug assembly, wherein said surface grooves allow said wedge to be displaced through said ring with relatively little force as compared to said breakaway force value.

* * * * *

UNITED STATES PATENT AND TRADEMARK OFFICE
CERTIFICATE OF CORRECTION

PATENT NO. : 5,437,310
DATED : August 1, 1995
INVENTOR(S) : Eugene E. Cunningham It is certified that error appears in the above-identified patent and that said Letters Patent is hereby corrected as shown below:

Column 3, line 10, after "FIG." there should be inserted --6.--.

Signed and Sealed this

Twenty-fourth Day of October, 1995

*Attest:*

BRUCE LEHMAN

*Attesting Officer*     *Commissioner of Patents and Trademarks*